Sept. 3, 1929.    F. NANKE    1,726,915
ORNITHOPTER
Filed April 20, 1928    3 Sheets-Sheet 2
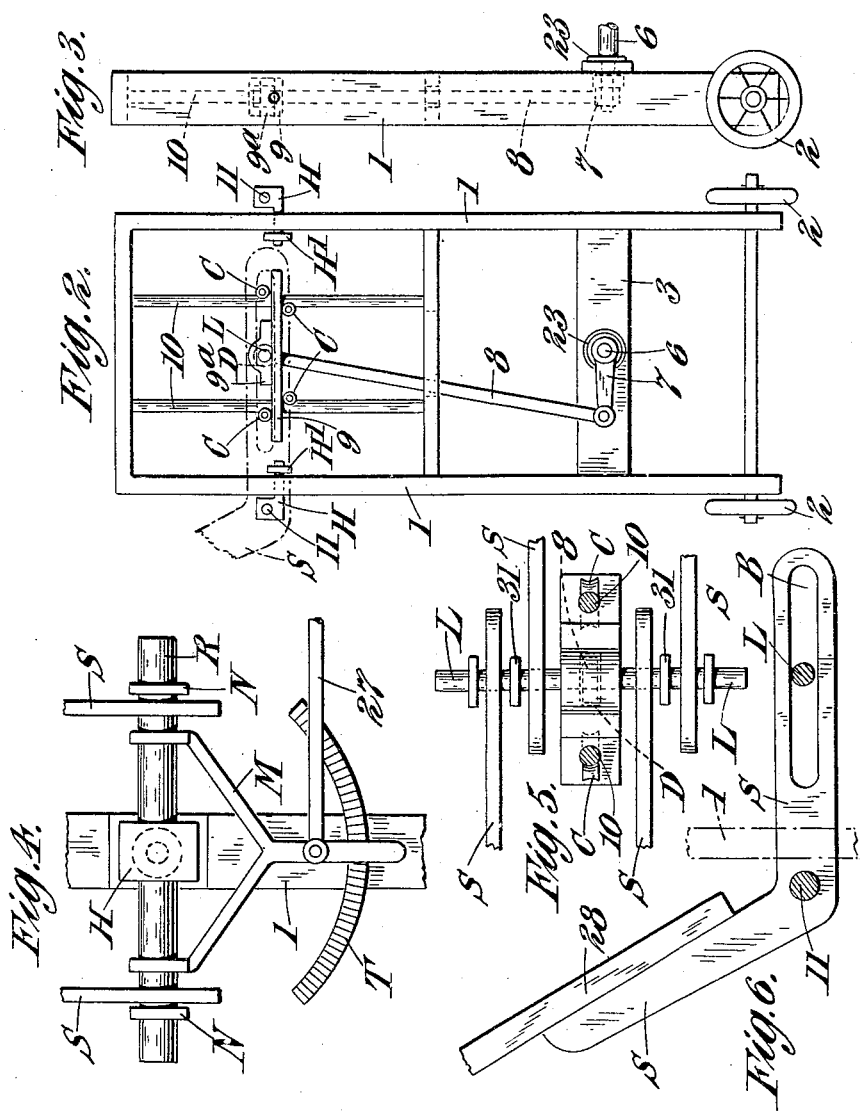
Inventor,
FELIX NANKE Sept. 3, 1929.  F. NANKE  1,726,915
ORNITHOPTER
Filed April 20, 1928   3 Sheets-Sheet 3
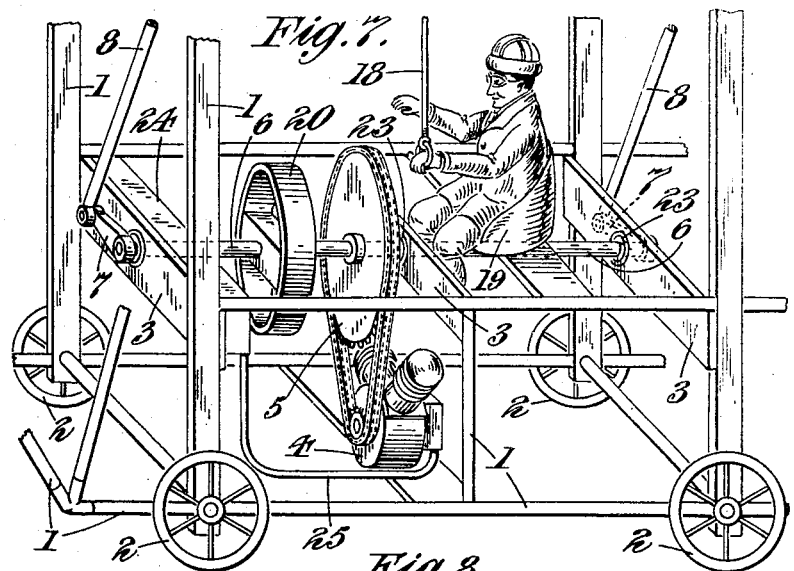
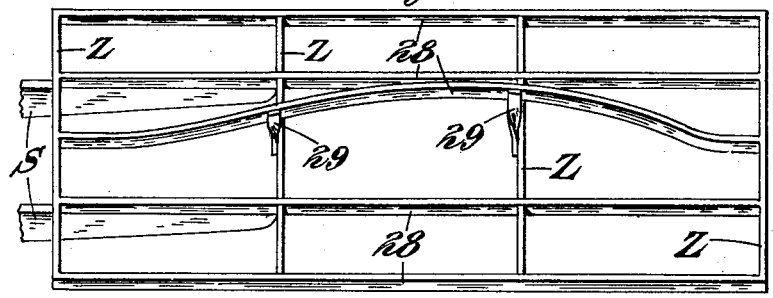
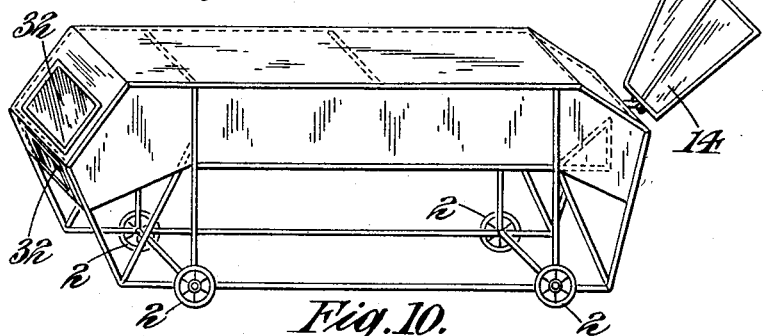
Inventor,
FELIX NANKE
BY Richards & Geier
ATTYS Patented Sept. 3, 1929.

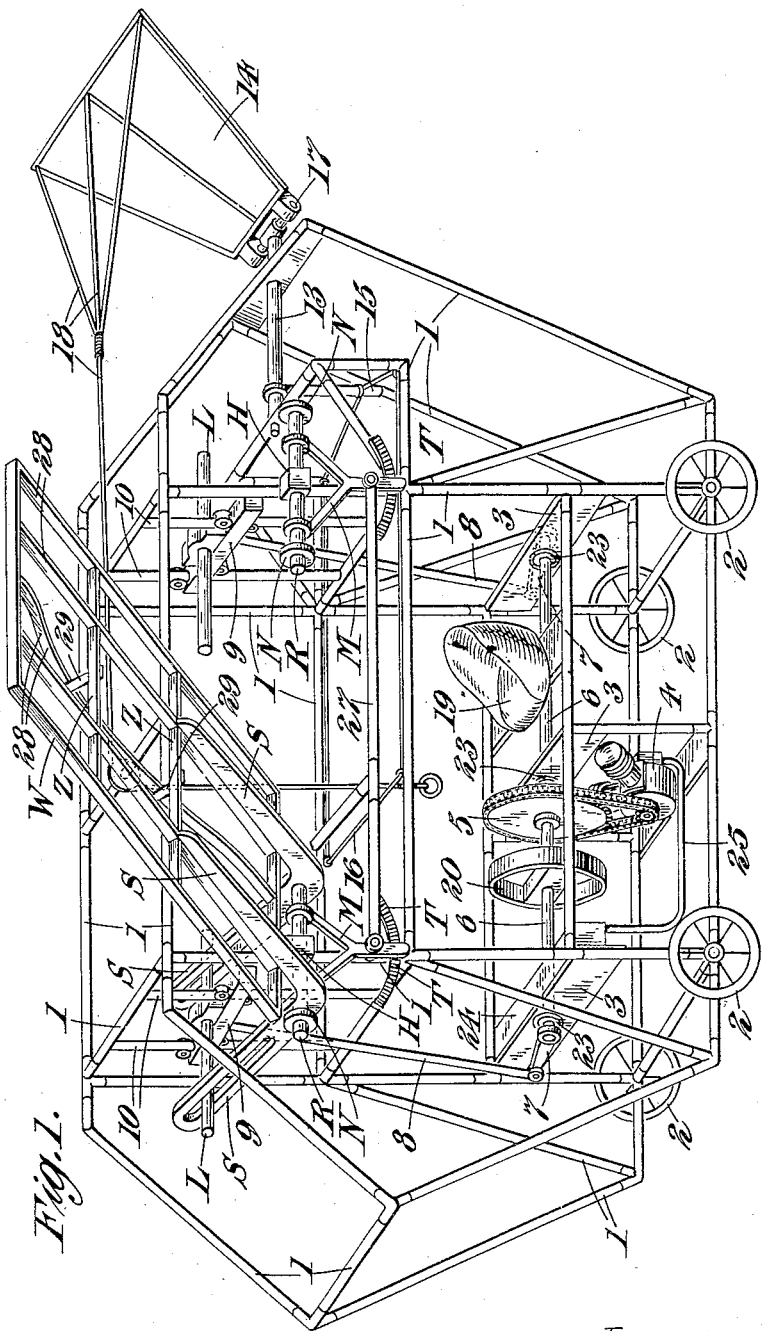

1,726,915

UNITED STATES PATENT OFFICE.

FELIX NANKE, OF WALTHAMSTOW, ENGLAND.

ORNITHOPTER.

Application filed April 20, 1928, Serial No. 271,599, and in Great Britain June 22, 1927.

This invention relates to improvements in ornithopters and has for its object to provide an efficient flying machine of simple construction and comprising a small number of component parts.

According to this present invention I provide an ornithopter in which a vertically disposed reciprocated rod is connected at one end to a crank arm secured to a driven shaft, and at the other end to means engaging slots in the wings to produce alternation thereof. I further provide that the wings may be tilted by the pilot, at will, and fixed at any desired angle to the normal horizontal position.

It has formerly been proposed to alternate the wings of aircraft by means of cranks engaging slots in the wings.

In one form of construction according to the present invention a framework which forms the body of the machine carries a suitably supported longitudinally extending shaft to which balancing means are fixed. Such means may conveniently comprise a split pulley suitably loaded at its periphery. This shaft is coupled to a power-unit fixed to the said framework and by crank, connecting rod and guide motions respectively produce alternations of longitudinally disposed rods, (hereinafter referred to as the leading rods) such rods engaging slots in members to which the wings are connected. The wings are preferably constructed such that the covering for each wing assumes a domed form.

Each wing is pivotally connected to the framework so that it may be tilted, means being provided for fixing the wings at any desired inclination to the horizontal. The framework is mounted upon wheels, which are preferably sprung, and seating accommodation is provided, moving parts which would interfere with the free movement of the pilot and passengers being encased. The machine is provided with a tail which is actuated by means positioned near the pilot's seat. The engine and other bulky parts are so arranged relative to the framework that the stability of the machine is assured. The parts which are used in the construction of the machine should be composed of materials such that lightness is combined with the necessary resistance to the stresses set up.

In order that my invention may be more fully understood reference will now be made to the accompanying drawings in which:—

Fig. 1 is a diagrammatic perspective view of the machine and

Figs. 2 to 10 show diagrammatically the details of certain parts.

Like references to denote the same parts are used throughout the figures.

With reference to Fig. 1 in which one wing only is shown for the sake of clearness, 1 represents the members which comprise the framework of the machine, which may for example be constructed of aluminum. 2 are the landing wheels which, as shown, may be coupled in pairs, and may, if desired be sprung to ensure resilient landings. Although the wheels are shown outside the framework, it is considered desirable to place them within the same. Each wheel may be independently mounted upon an axle, the latter being, in this case preferably supported upon two bearings. The ball bearings 23 are mounted in transverse members 3 and serve as supports for the shaft 6, which carries the gear-wheel 5 chain-coupled to a smaller wheel on the engine shaft of the power unit 4. The engine speed is consequently geared down, it being considered that an 8 to 1 ratio would be a suitable reduction factor. The shaft 6, preferably provided with guard means must be of such length that the pilot, whilst on seat 19, is clear of the ends of the leading rods L. Each end of the shaft 6 is provided with crank-arms 7 secured to the connecting rods 8 which move the centre plates 9 vertically to and fro on the guide rods 10, so that the leading rods L participate also in a similar motion, being kept in parallel relationship with the shaft 6. The leading rods L are bolted securely to the centre plates 9 and engage with the slots B in the wingspars S, said wingspars being pivotally connected at 11 on the rods R. It is thus seen that reciprocating motion imparted to the connecting rod 8 will result in a flapping or oscillating motion to the wings connected to the wingspars S. The holder H is passed through the corner stay of the framework 1 and carries the rod R, so that the revolving of H in its housing will result in the tilting both of the wingspars S and of the wing W.

Four wings W are provided on the machine, two on each side—a pair in the front of the machine and a pair at the back, the bulk of the weight reposing between said pairs. There will thus be eight wingspars S, four rods R, and four holders H fitted to the machine.

The tail 14, connected to the bar 13 by hinges 17, is raised or lowered from the pilot's seat by the system of wiring 18. The rod 15 fixed to the rod 13 is moved to the right or left by means of the wire 16 and so imparts a rotary motion to the rod 13 rigidly fixed to the tail 14.

Bolted to the shaft 6 is a member 20 of wheel formation, made as large as is convenient, and suitably loaded at its periphery to serve in maintaining balance in the moving device, in that it leaves all the power for producing the flapping of the wings, and when the engine, which is provided with a clutch, is released, the pilot can, with the aid of this member 20 keep the wings in a horizontal position. The pipe 25 allows petrol to pass from the tank 24 to the carburettor of the power unit 4.

Fig. 2 is a front view of the machine in which the crank arm 7, connecting rod 8, guide rods 10, centre plate 9, and guide rollers C are shown, and Fig. 3 is a side view thereof. The centre plate 9 is provided with a projection 9ª through which the leading rod L passes, a slot D allowing the end of the connecting rod 8 to pass through. Four small grooved wheels C are provided, which are fixed rigidly to plate 9 by brackets and roll upon the guide rods 10. It is found that the use of these wheels does not afford sufficient lateral rigidity to the leading rod L, so that it is proposed now to replace them by sleeves. The holders H, through which rods R pass, may if desired instead of passing through the corner stay as shown, be bracketed to the outside thereof. A nut H' is employed to keep the holder in position.

Fig. 4 shows the arrangement whereby one of the wings may be moved from its normal horizontal position to a tilted position in either direction. The tilting of the wings will produce a forward movement of the machine in flight. Each of the four wings is provided with a similar device, each pair of wings on the same side of the machine being coupled together as shown in Fig. 1 by means of a rod 27 and the two rods 27 are joined to the yokes M and then connected together by another rod extending across the machine and within easy reach of the pilot. It will thus be observed that the pilot may simultaneously tilt all four wings to the desired obliquity. It will be readily understood that the displacement of the rod 27 either to the right or to the left will cause the rods R, the wingspars S and the wings W to become inclined the whole swivelling about the holder H and being locked in any desired position by means of the toothed segment T, rigidly connected to the corner stay 1.

Fig. 5 shows a top view of the parts which are mounted on rod L. The wooden discs 31 serve to prevent contact between the wingspars S when the same are in motion. Two similar blocks are mounted on this rod L and serve to restrict the outward movement of the wingspars S.

Fig. 6 shows a wingspar S which is provided with a slot B, in which the leading rod L moves, the slot B being made of ample dimensions relative to the size of the rod L, so that free movement may take place when the wingspar is tilted.

Fig. 7 shows the lower part of the machine drawn to a larger scale than that shown in Fig. 1.

Fig. 8 shows one of the wings in part-plan view. The wing is represented as comprising five thin flat steel bars 28, two of these being rigidly connected to the wingspars S, and the structure being completed by the secure attachment of the transverse bars Z to the said bars 28. The centre bar 28 is curved so that the covering will produce a dome 30, such as that shown in Fig. 9. Rigidity of the said centre bar is assured by the provision of two uprights 29. The whole wing is covered with fabric, secured by a fine meshed net and lashed underneath.

In Fig. 10 the framework of the machine is shown covered, windows 32 and 33 being provided if desired to afford the pilot a clear field of vision.

The framework is preferably braced to produce greater rigidity and strength and the wings are preferably made collapsible so that less space is required for the housing of the machine.

The clutch and starting means may be hand or foot operated, and suitable speed ratios between the engine shaft and the wing driving shaft are obtained by wheel trains with or without chain coupling.

I claim:

1. An ornithopter comprising a frame, a vertically reciprocating plate mounted therein, a leading rod supported by said plate and extending on opposite sides thereof, a pair of pivot rods carried by said frame with one of said rods disposed on each side of said plate, a pair of wings each of which is mounted for oscillation on one of said pivot rods, wingspars for each wing disposed on opposite sides of said plate and having slots therein for receiving said leading rod, and means to reciprocate said plate to impart oscillations to said wings.

2. An ornithopter comprising a frame, a vertically reciprocating plate mounted therein, a leading rod supported by said plate and extending on opposite sides thereof, a pair of pivot rods carried by said frame with one of said rods disposed on each side of said plate, a pair of wings each of which is mounted for oscillation on one of said pivot rods, wingspars for each wing disposed on opposite sides of said plate and having slots therein for receiving said leading rod, means to reciprocate said plate to impart oscillations to said wings, holders rockingly carried by said frame and through which said pivot rods extend, a yoke member secured to each pivot rod, and connections to said yoke members for operating the same to rock said pivot rods and thereby vary the inclination of said wings.

3. An ornithopter comprising a frame, a vertically reciprocating plate mounted therein, a leading rod supported by said plate and extending on opposite sides thereof, a pair of pivot rods carried by said frame with one of said rods disposed on each side of said plate, a pair of wings each of which is mounted for oscillation on one of said pivot rods, wingspars for each wing disposed on opposite sides of said plate and having slots therein for receiving said leading rod, means to reciprocate said plate to impart oscillations to said wings, holders rockingly carried by said frame and through which said pivot rods extend, a yoke member secured to each pivot rod, connections to said yoke members for operating the same to rock said pivot rods and thereby vary the inclination of said wings, and means to lock said yoke members in adjusted positions.

4. In a wing structure for ornithopters comprising a plurality of longitudinal bars one of which is curved intermediate its ends to extend above the plane of the other bars, transverse bracing bars connecting certain of said longitudinal bars, and perpendicular braces joining said transverse bars with the curved longitudinal bar.

In testimony whereof I have affixed my signature.

FELIX NANKE.